United States Patent
Kissell

(10) Patent No.: US 7,617,388 B2
(45) Date of Patent: Nov. 10, 2009

(54) VIRTUAL INSTRUCTION EXPANSION USING PARAMETER SELECTOR DEFINING LOGIC OPERATION ON PARAMETERS FOR TEMPLATE OPCODE SUBSTITUTION

(75) Inventor: Kevin D. Kissell, Le Bar sur Loup (FR)

(73) Assignee: MIPS Technologies, Inc., Sunnyvale, CA (US)

( * ) Notice: Subject to any disclaimer, the term of this patent is extended or adjusted under 35 U.S.C. 154(b) by 0 days.

(21) Appl. No.: 11/644,001

(22) Filed: Dec. 22, 2006

(65) Prior Publication Data

US 2007/0106889 A1 May 10, 2007

Related U.S. Application Data

(63) Continuation of application No. 09/788,682, filed on Feb. 21, 2001, now Pat. No. 7,162,621.

(51) Int. Cl.
*G06F 9/30* (2006.01)
(52) U.S. Cl. ............ 712/242; 712/211; 712/243
(58) Field of Classification Search ............ None
See application file for complete search history.

(56) References Cited

U.S. PATENT DOCUMENTS

| | | |
|---|---|---|
| 3,614,406 A | 10/1971 | Brown |
| 3,642,744 A | 2/1972 | Moberly et al. |
| 3,654,621 A | 4/1972 | Bock et al. |
| 3,916,388 A | 10/1975 | Shrimp et al. |
| 4,023,023 A | 5/1977 | Bourrez et al. |
| 4,109,310 A | 8/1978 | England et al. |
| 4,126,896 A | 11/1978 | Yamazaki |
| 4,128,880 A | 12/1978 | Cray, Jr. |
| 4,130,880 A | 12/1978 | Nutter |
| 4,173,041 A | 10/1979 | Dvorak et al. |
| 4,219,874 A | 8/1980 | Gusev et al. |

(Continued)

FOREIGN PATENT DOCUMENTS

DE 196 44 688 A1 4/1998

(Continued)

OTHER PUBLICATIONS

*A236 Parallel Digital Signal Processor Chip Programmer's Reference Manual*, Oxford Micro Device, Inc., 1994, 195 pages (Bates No. L11184-L11378).

(Continued)

*Primary Examiner*—Kenneth S Kim
(74) *Attorney, Agent, or Firm*—Sterne, Kessler, Goldstein & Fox P.L.L.C.

(57) ABSTRACT

An extendable instruction set architecture is provided. In an embodiment, a microprocessor includes a memory, a virtual instruction expansion store, and substitution logic. The memory stores at least one virtual instruction that includes an index and at least one parameter. The virtual instruction expansion store includes at least one instruction template and at least one parameter selector. The substitution logic forms a sequence of at least one expanded instruction. In an example, each expanded instruction is based on an instruction template and includes a new parameter for use with the instruction template. The new parameter is generated by performing a logical operation from the parameter selector on one or more parameter of the virtual instruction.

22 Claims, 4 Drawing Sheets

U.S. PATENT DOCUMENTS

| | | | |
|---|---|---|---|
| 4,302,820 A | 11/1981 | Struger et al. | |
| 4,307,445 A | 12/1981 | Tredennick et al. | |
| 4,317,170 A | 2/1982 | Wada et al. | |
| 4,394,736 A | 7/1983 | Bernstein et al. | |
| 4,396,982 A | 8/1983 | Wada et al. | |
| 4,434,462 A | 2/1984 | Guttag et al. | |
| 4,491,910 A | 1/1985 | Caudel et al. | |
| 4,495,598 A | 1/1985 | Vahlstrom et al. | |
| 4,507,731 A | 3/1985 | Morrison et al. | |
| 4,511,990 A | 4/1985 | Hagiwara et al. | |
| 4,520,439 A | 5/1985 | Liepa | |
| 4,538,239 A | 8/1985 | Magar | |
| 4,583,199 A | 4/1986 | Boothroyd et al. | |
| 4,586,130 A | 4/1986 | Butts, Jr. et al. | |
| 4,763,246 A * | 8/1988 | Holt et al. | 712/212 |
| 4,771,463 A | 9/1988 | Beeman | |
| 4,773,006 A | 9/1988 | Kinoshita et al. | |
| 4,809,212 A | 2/1989 | New et al. | |
| 4,811,215 A | 3/1989 | Smith | |
| 4,814,976 A | 3/1989 | Hansen et al. | |
| 4,825,363 A | 4/1989 | Baumann et al. | |
| 4,829,380 A | 5/1989 | Iadipaolo | |
| 4,847,801 A | 7/1989 | Tong | |
| 4,852,037 A | 7/1989 | Aoki | |
| 4,860,192 A | 8/1989 | Sachs et al. | |
| 4,868,777 A | 9/1989 | Nishiyama et al. | |
| 4,878,174 A | 10/1989 | Watkins et al. | |
| 4,879,676 A | 11/1989 | Hansen | |
| 4,884,197 A | 11/1989 | Sachs et al. | |
| 4,891,781 A | 1/1990 | Omura | |
| 4,899,275 A | 2/1990 | Sachs et al. | |
| 4,924,435 A | 5/1990 | Brunvand et al. | |
| 4,928,223 A | 5/1990 | Dao et al. | |
| 4,949,250 A | 8/1990 | Bhandarkar et al. | |
| 4,992,934 A | 2/1991 | Portanova et al. | |
| 5,005,118 A | 4/1991 | Lenoski | |
| 5,073,864 A | 12/1991 | Methvin et al. | |
| 5,136,696 A | 8/1992 | Beckwith et al. | |
| 5,150,290 A | 9/1992 | Hunt | |
| 5,177,701 A | 1/1993 | Iwasa | |
| 5,181,183 A | 1/1993 | Miyazaki | |
| 5,185,713 A | 2/1993 | Kobunaya | |
| 5,193,202 A | 3/1993 | Jackson et al. | |
| 5,220,656 A | 6/1993 | Itomitsu et al. | |
| 5,222,244 A | 6/1993 | Carbine et al. | |
| 5,235,686 A | 8/1993 | Bosshart | |
| 5,280,439 A | 1/1994 | Quek et al. | |
| 5,280,593 A | 1/1994 | Bullions, III et al. | |
| 5,299,147 A | 3/1994 | Holst | |
| 5,321,821 A * | 6/1994 | Itomitsu et al. | 712/210 |
| 5,392,228 A | 2/1995 | Burgess et al. | |
| 5,392,408 A | 2/1995 | Fitch | |
| 5,396,502 A | 3/1995 | Owsley et al. | |
| 5,418,915 A | 5/1995 | Matuda et al. | |
| 5,452,241 A | 9/1995 | Desrosiers et al. | |
| 5,479,620 A | 12/1995 | Kiyohara et al. | |
| 5,499,299 A | 3/1996 | Takenaka et al. | |
| 5,502,829 A | 3/1996 | Sachs | |
| 5,513,366 A | 4/1996 | Agarwal et al. | |
| 5,517,438 A | 5/1996 | Dao-Trong et al. | |
| 5,537,562 A | 7/1996 | Gallup et al. | |
| 5,537,629 A | 7/1996 | Brown et al. | |
| 5,550,768 A | 8/1996 | Ogilvie et al. | |
| 5,559,974 A | 9/1996 | Boggs et al. | |
| 5,560,028 A | 9/1996 | Sachs et al. | |
| 5,581,773 A | 12/1996 | Glover | |
| 5,590,345 A | 12/1996 | Barker et al. | |
| 5,598,571 A | 1/1997 | Gallup et al. | |
| 5,664,136 A | 9/1997 | Witt et al. | |
| 5,666,298 A | 9/1997 | Peleg et al. | |
| 5,669,010 A | 9/1997 | Duluk, Jr. | |
| 5,671,401 A | 9/1997 | Harrell | |
| 5,673,407 A | 9/1997 | Poland et al. | |
| 5,696,937 A | 12/1997 | White et al. | |
| 5,713,035 A | 1/1998 | Farrell et al. | |
| 5,717,910 A | 2/1998 | Henry | |
| 5,721,892 A | 2/1998 | Peleg et al. | |
| 5,726,927 A | 3/1998 | Wolrich et al. | |
| 5,729,554 A | 3/1998 | Weir et al. | |
| 5,729,724 A | 3/1998 | Sharangpani et al. | |
| 5,729,728 A | 3/1998 | Colwell et al. | |
| 5,734,600 A | 3/1998 | Dieffenderfer et al. | |
| 5,734,874 A | 3/1998 | Van Hook et al. | |
| 5,740,340 A | 4/1998 | Purcell et al. | |
| 5,748,979 A | 5/1998 | Trimberger | |
| 5,752,071 A | 5/1998 | Tubbs et al. | |
| 5,758,176 A | 5/1998 | Agarwal et al. | |
| 5,761,523 A | 6/1998 | Wilkinson et al. | |
| 5,768,172 A | 6/1998 | Derby | |
| 5,774,709 A | 6/1998 | Worrell | |
| 5,778,241 A | 7/1998 | Bindloss et al. | |
| 5,781,457 A | 7/1998 | Cohen et al. | |
| 5,784,602 A | 7/1998 | Glass et al. | |
| 5,790,827 A | 8/1998 | Leung | |
| 5,793,661 A | 8/1998 | Dulong et al. | |
| 5,794,003 A | 8/1998 | Sachs | |
| 5,796,973 A | 8/1998 | Witt et al. | |
| 5,798,923 A | 8/1998 | Laskowski | |
| 5,809,294 A | 9/1998 | Ando | |
| 5,812,147 A | 9/1998 | Van Hook et al. | |
| 5,815,695 A | 9/1998 | James et al. | |
| 5,815,723 A | 9/1998 | Wilkinson et al. | |
| 5,819,117 A | 10/1998 | Hansen et al. | |
| 5,822,606 A | 10/1998 | Morton | |
| 5,838,984 A | 11/1998 | Nguyen et al. | |
| 5,838,986 A | 11/1998 | Garg et al. | |
| 5,848,255 A | 12/1998 | Kondo | |
| 5,848,269 A | 12/1998 | Hara | |
| 5,850,452 A | 12/1998 | Sourgen et al. | |
| 5,852,726 A | 12/1998 | Lin et al. | |
| 5,864,703 A | 1/1999 | Van Hook et al. | |
| 5,867,682 A | 2/1999 | Witt et al. | |
| 5,875,336 A | 2/1999 | Dickol et al. | |
| 5,875,355 A | 2/1999 | Sidwell et al. | |
| 5,880,984 A | 3/1999 | Burchfiel et al. | |
| 5,881,307 A | 3/1999 | Park et al. | |
| 5,887,183 A | 3/1999 | Agarwal et al. | |
| 5,892,960 A | 4/1999 | Seide | |
| 5,918,031 A | 6/1999 | Morrison et al. | |
| 5,922,066 A | 7/1999 | Cho et al. | |
| 5,926,642 A | 7/1999 | Favor | |
| 5,933,650 A | 8/1999 | Van Hook et al. | |
| 5,936,872 A | 8/1999 | Fischer et al. | |
| 5,944,776 A | 8/1999 | Zhang et al. | |
| 5,953,241 A | 9/1999 | Hansen et al. | |
| 5,960,012 A | 9/1999 | Spracklen | |
| 5,961,629 A | 10/1999 | Nguyen et al. | |
| 5,996,056 A | 11/1999 | Volkonsky | |
| 5,996,062 A | 11/1999 | Sachs | |
| 5,996,066 A | 11/1999 | Yung | |
| 6,006,316 A | 12/1999 | Dinkjian | |
| 6,009,261 A | 12/1999 | Scalzi et al. | |
| 6,009,450 A | 12/1999 | Dworkin et al. | |
| 6,026,420 A | 2/2000 | DesJardins et al. | |
| 6,035,120 A | 3/2000 | Ravichandran | |
| 6,035,316 A | 3/2000 | Pelleg et al. | |
| 6,035,317 A | 3/2000 | Guy | |
| 6,041,403 A | 3/2000 | Parker et al. | |
| 6,058,465 A | 5/2000 | Nguyen | |
| 6,058,500 A | 5/2000 | DesJardins et al. | |
| 6,065,115 A | 5/2000 | Sharangpani et al. | |
| 6,066,178 A | 5/2000 | Bair et al. | |
| 6,067,615 A | 5/2000 | Upton | |
| 6,073,154 A | 6/2000 | Dick | |

| | | | |
|---|---|---|---|
| 6,075,937 A * | 6/2000 | Scalzi et al. ............ 703/23 | |
| 6,078,941 A | 6/2000 | Jiang et al. | |
| 6,088,783 A | 7/2000 | Morton | |
| 6,122,738 A | 9/2000 | Millard | |
| 6,128,726 A | 10/2000 | LeComec | |
| 6,138,229 A | 10/2000 | Kucukcakar et al. | |
| 6,141,421 A | 10/2000 | Takaragi et al. | |
| 6,141,786 A | 10/2000 | Cox et al. | |
| 6,145,077 A | 11/2000 | Sidwell et al. | |
| 6,154,834 A | 11/2000 | Neal et al. | |
| 6,172,494 B1 | 1/2001 | Feuser | |
| 6,181,729 B1 | 1/2001 | O'Farrell | |
| 6,185,668 B1 | 2/2001 | Arya | |
| 6,192,491 B1 | 2/2001 | Cashman et al. | |
| 6,199,087 B1 | 3/2001 | Blake et al. | |
| 6,199,088 B1 | 3/2001 | Weng et al. | |
| 6,233,597 B1 | 5/2001 | Tanoue et al. | |
| 6,243,732 B1 | 6/2001 | Arakawa et al. | |
| 6,263,429 B1 | 7/2001 | Siska | |
| 6,266,758 B1 | 7/2001 | Van Hook et al. | |
| 6,279,023 B1 | 8/2001 | Weng et al. | |
| 6,282,635 B1 | 8/2001 | Sachs | |
| 6,292,883 B1 | 9/2001 | Augusteijn et al. | |
| 6,295,599 B1 | 9/2001 | Hansen et al. | |
| 6,298,438 B1 | 10/2001 | Thayer et al. | |
| 6,314,445 B1 | 11/2001 | Poole | |
| 6,336,178 B1 | 1/2002 | Favor | |
| 6,349,318 B1 | 2/2002 | Vanstone et al. | |
| 6,349,377 B1 | 2/2002 | Lindwer | |
| 6,397,241 B1 | 5/2002 | Glaser et al. | |
| 6,421,817 B1 | 7/2002 | Mohan et al. | |
| 6,425,124 B1 | 7/2002 | Tominaga et al. | |
| 6,453,407 B1 | 9/2002 | Lavi et al. | |
| 6,480,605 B1 | 11/2002 | Uchiyama et al. | |
| 6,480,872 B1 | 11/2002 | Choquette | |
| 6,513,054 B1 | 1/2003 | Carroll | |
| 6,523,054 B1 | 2/2003 | Kamijo | |
| 6,587,939 B1 | 7/2003 | Takano | |
| 6,615,366 B1 | 9/2003 | Grochowski et al. | |
| 6,625,726 B1 | 9/2003 | Clark et al. | |
| 6,625,737 B1 | 9/2003 | Kissell | |
| 6,651,160 B1 | 11/2003 | Hays | |
| 6,658,561 B1 | 12/2003 | Benayoun et al. | |
| 6,711,602 B1 | 3/2004 | Bhandal et al. | |
| 6,760,742 B1 | 7/2004 | Hoyle | |
| 6,892,293 B2 | 5/2005 | Sachs et al. | |
| 6,952,478 B2 | 10/2005 | Lee et al. | |
| 6,976,178 B1 | 12/2005 | Kissell | |
| 7,003,715 B1 | 2/2006 | Thurston | |
| 7,142,668 B1 | 11/2006 | Kogure | |
| 7,162,621 B2 | 1/2007 | Kissell | |
| 7,181,484 B2 | 2/2007 | Stribaek et al. | |
| 7,237,097 B2 | 6/2007 | Kissell et al. | |
| 2001/0052118 A1 | 12/2001 | Steinbusch | |
| 2002/0013691 A1 | 1/2002 | Warnes | |
| 2002/0062436 A1 | 5/2002 | Van Hook et al. | |
| 2002/0069402 A1 | 6/2002 | Nevill et al. | |
| 2002/0116428 A1 | 8/2002 | Stribaek et al. | |
| 2002/0116603 A1 | 8/2002 | Kissell | |
| 2002/0178203 A1 | 11/2002 | Stribaek et al. | |
| 2003/0172254 A1 | 9/2003 | Mandavilli et al. | |
| 2006/0190518 A1 | 8/2006 | Ekner et al. | |

FOREIGN PATENT DOCUMENTS

| | | |
|---|---|---|
| EP | 0 681 236 A1 | 11/1995 |
| EP | 0 757 312 A1 | 2/1997 |
| EP | 0 681 236 B1 | 11/2000 |
| JP | 07-182142 | 7/1995 |
| JP | 10-11289 A | 1/1998 |
| JP | 11-003226 | 1/1999 |
| JP | 11-174955 | 7/1999 |
| JP | 2000-293507 | 10/2000 |
| JP | 2000-321979 | 11/2000 |
| WO | WO 97/07450 A1 | 2/1997 |
| WO | WO 97/08608 A1 | 3/1997 |

OTHER PUBLICATIONS

Bier, J., "DSP16xxx Targets Communications Apps," Microprocessor Report, MicroDesign Resources, Sep. 15, 1997, pp. 11-15.

*DSP56000 24-Bit Digital Signal Processor Family Manual*, Motorola, Inc., 1995, 638 pages (Bates No. L08722-L09359).

*i860™ Microprocessor Family Programmer's Reference Manual*, Intel Corporation, 1992, 79 pages (Bates No. L09361-L09439).

*IEEE Standard for Binary Floating-Point Arithmetic*, IEEE, 1985, pp. i-vi and 1-14.

*TMS320C1x/C2x/C2xx/C5x Assembly Language Tools User's Guide*, Texas Instruments, Mar. 1995, 483 pages (Bates No. L07916-L08398).

*TMS320C5x General-Purpose Applications User's Guide*, Texas Instruments, Jul. 1997, 167 pages (Bates No. L08399-L08565).

*VIS™ Instruction Set User's Manual*, Sun Microsystems, Inc., 1997, pp. i-xii and 1-136.

Walter Hollingsworth et al., *"The Clipper™ Processor: Instruction Set Architecture and Implementation,"* Communications of the ACM, vol. 32, No. 2, pp. 200-219, ACM, Feb. 1989.

*Fairchild CLIPPER™ 32-Bit Microprocessor User's Manual*, Prentice-Hall, Inc., Englewood Cliffs, New Jersey (1987).

Clipper architecture: Information from Answers.com at <http://www.answers.com/topic/clipper-architecture>, 4 pages (retrieved Jul. 25, 2006).

Jae Wook Chung et al., "Fast Implementation of Elliptic Curve Defined over GF ($p^m$) on CalmRISC with MAC2424 Coprocessor", C.K. Koc and C. Paar (Eds.): CHES 2000, LNCS 1965, pp. 57-70, 2000.

Darrel Hankerson et al., "Software Implementation of Elliptic Curve Cryptography Over Binary Fields", C.K. Koc and C. Paar (Eds.): CHES 2000, LNCS 1965, pp. 1-24, 2000.

Marc Joye et al., "Efficient Generation of Prime Numbers", C.K. Koc and C. Paar (Eds.): CHES 2000, LNCS 1965, pp. 340-354, 2000.

Souichi Okada et al., "Implementation of Elliptic Curve Crytographic Coprocessor over GF ($2^m$) on an FPGA", C.K. Koc and C. Paar (Eds.): CHES 2000, LNCS 1965, pp. 25-40, 2000.

Geraldo Orlando et al., "A High-Performance Reconfigurable Elliptic Curve Processor for GF($2^m$)*", C.K. Koc and C. Paar (Eds.): CHES 2000, LNCS 1965, pp. 41-56, 2000.

Erkay Savas et al., "A Scalable and Unified Multiplier Architecture for Finite Fields GF(p) and GF($2^m$)*", C.K. Koc and C. Paar (Eds.): CHES 2000, LNCS 1965, pp. 277-292, 2000.

Zhijie Shie et al., "Bit Permutation Instructions for Accelerating Software Cryptography", Proceedings of the IEEE International Conference on Application-Specific Systems, Architectures and Processors, July 10-12, 2000, Boston, Massachusetts, USA, pp. 138-148.

601 First Silicon, at http://www.mot.com/SPSPowerPC/library/press_releases/601_First_Silicon.html, 2 pages (Oct. 1, 1992).

An Introduction to Thumb™, Version 2.0, Advanced RISC Machines, Mar. 1995, 29 pages.

AN1214: MC881 10 64-bit External Bus Interface to 16-bit EPROM, at htto://www.mot-sps.com/lit/html/anL214.html, 1 page (Jan. 24, 1997).

Can Silicon Stop the Smartcard Hackers? Electronic Times, Feb. 15, 1999, available in Electronics Times 321999 WL 9348105 (2 pages).

Case, B., "Superscalar Techniques: SuperSPARC vs. 88110", Microprocessor Report, vol. 5, No. 22, Dec. 4, 1991, pp. 1 and 6-11.

Certification Report BSI-DSZ-CC-0203-2003 for Philips Smart Card Controller P16WX064VOC [online]. Philips Semiconductors GmbH [Retrieved on Feb. 1, 2006]. Retrieved from the Internet: <URL: http://www.bsi.bund.de/zertifiz/zert/reporte/0203a.pdf>.

Clavier, C. et al. "Differential Power Analysis in the Presence of Hardware Countermeasures," in Proceedings of Second International Workshop on Cryptographic Hardware and Embedded Systems, CHES2000 (Eds., C.K. Koc and C. Paar), Worcester, Massachusetts, USA, Aug. 17-18, 2000, pp. 252-263 Springer-Verlag, Berlin/Heidelberg, Germany (2000).

European Search Report from European Appl. No. EP 02 71 7430, dated Feb. 16, 2006, 3 pages.

Coron, J.-S. and Goubin, L., "On Boolean and Arithmetic Masking Against Differential Power Analysis," in Proceedings of Second International Workshop on Cryptographic Hardware and Embedded Systems, CHES 2000 (Eds., C.K. Koc and C. Paar), Worcester, Massachusetts, USA, Aug. 17-18, 2000, pp. 231-237, Springer-Verlag, Berlin/Heidelberg, Germany (2000).

Daemen, J. et al., "Bitslice Ciphers and Power Analysis Attacks," presented at Fast SoftwareEncryption Workshop 2000, New York, New York, USA, Apr. 10-12, 2000 (16 pages).

Dhem, J.F and Feyt, N., "Hardware and Software Symbiosis Helps Smart Card Evolution" [online]. IEEE Micro, Nov.-Dec. 2001, pp. 14-25 [Retrieved on Feb. 1, 2006]. Retrieved from the Internet: <URL: http://www.it.iitb.ac.in/~satish/ Thesis%20Report%20New%201/2_ Review%20of%20literature/ 2_reference/ 2_29_Hardware%20and%20software%20symbiosis%20helps%20smart%20card%20evolution.pdf>.

Dhem, J.F and Feyt, N., "Present and Future Smart Cards" [online]. Gemplus - Card Security Group, pp. 1-9 [Retrieved on Feb. 1, 2006]. Retrieved from the Internet: <URL: http://wwvv.it-c.dk/courses/ DSK/F2003/smart2.pdf>.

Diefendorff, K., "The 88110: A Superscalar Microprocessor with Graphics Support" (Motorola), Microprocessor Forum, Nov. 1991, 20 pages (Bates Nos. L00622-00641).

Diefendorff, K., and Allen, M., "Organization of the Motorola 88110: A Superscalar RISC Microprocessor," Motorola Inc., 12 pages (Bates Nos. L00642-L00653). IEEE Micro Apr. 1992.

Digital Equipment Corporation, VAX 11/780 Architecture Handbook, 1977. pp. 6-26, 6-27, 6-30, 6-31.

Drescher, W., and Fettweis, G., "VLSI Architectures for Multiplication in GF(2m) for Application Tailored Digital Signal Processors," in VLSI Signal Processing, IX, San Francisco, California, USA (Oct. 30 - Nov. 1, 1996), IEEE, Piscataway, New Jersey, USA, pp. 55-64.

Drescher, W., et al., "VLSI Architecture for Datapath Integration of Arithmetic Over GF(2m) on Digital Signal Processors," in IEEE International Conference on Acoustics, Speech, and Signal Processing, Munich, Germany (Apr. 21-24, 1997), IEEE, Los Alamitos, California, USA, pp. 631-634.

DSP56002 24-Bit Digital Signal Processor User's Manual, Motorola, Inc., 1995, 386 pages (Bates Nos. L07277-L07662).

DSP56002 Semiconductor Technical Data, Motorola, Inc., 1996, 110 pages (Bates Nos. L07803-L07912).

DSP56002/DSP56L002 Motorola Semiconductor Product Information, Motorola, Inc., 1994, 3 pages (Bates Nos. L07913-L07915).

EB162: Programming Tips (MC88110), at http://www.mot-sps.com/ lit/html/eb162.html, 1 page (Jan. 24, 1997).

English language abstract for Japanese Patent Publication No. 11-003226 titled "Visual Instruction Set for CPU Having Integrated Graphics Function," inventor Robert Yung, published Jan. 6, 1999.

English language abstract for Japanese Patent Publication No. 11-174955 titled "Open Key Ciphering Device, Open Key Ciphering and Deciphering Devices, and Deciphering Program Recording Medium," inventors Uchiyama et al., published Jul. 2, 1999.

English language abstract for Japanese Patent Publication No. 2000-293507 titled "Device and Method for Generating Expression Data in Operation of Finite Field," inventor Atsushi Kogure, published Oct. 20, 2000.

English language abstract for Japanese Patent Publication No. 2000-321979 titled "Polynomial Arithmetic Device, Device for Calculating Order of Elliptic Curve, Device for Generating Elliptic Curve, and Cryptographic System for Elliptic Curve," inventor Yuichi Fuda, published Nov. 24, 2000.

European Search Report cited in Application No. 02706275.1 - 2212 / 1386224 dated Oct. 23, 2008.

Eyre, J., et al., "Infineon's TriCore Tackles DSP," Microprocessor Report, Apr. 19, 1999, pp. 12-14.

Feigel, C.P., "Ti Introduces Four-Processor DSP Chip," Microprocessor Report, Mar. 28, 1994, pp. 22-25.

Galois Filed Arithmetic Library, www.partow.net/projects/galois/ Jan. 2, 2006, 4 Pages.

Gwennap, L., "Digital, MIPS Add Multimedia Extensions," Microsprocessor Report, Micro Design Resources, vol. 10, No. 15, Nov. 18, 1996, pp. 1-5.

Gwennap, L., "Intel's MMX Speeds Multimedia," Microprocessor Report, MicroDesign Resources, vol. 10, No. 3, Mar. 5, 1996, 6 Pages.

Gwennap, L., "New Multimedia Chips to Enter the Fray," Microprocessor Report, MicroDesign Resources, vol. 10, No. 13, Oct. 1996, p. 9.

Gwennap, L., "UltraSparc Adds Multimedia Instructions," Microprocessor Report, MicroDesign Resources, vol. 8, No. 16, Dec. 5, 1994, pp. 1-3.

Halfhill, T.R. and Belgard, R., "Mips vs. Lexra: Definitely Not Aligned," Microprocessor Report, vol. 13, No. 16, Dec. 6,1999, pp. 1-5.

Hansen, Craig, "Architecture of a Broadband Mediaprocessor," COMPCON96, Feb. 25-29, IEEE, 1996, 8 pages (Bates Nos. L00654-L00661).

Hardware Implications of xmem as a at followed by a ld, Motorola Semiconductor Engineering Bulletin, Motorola, Sep. 1992, 5 pages.

Hasan, M. Anwar, "Power Analysis Attacks and Algorithmic Approaches to their Countermeasures for Koblitz Curve Cryptosystems," in Proceedings of Second International Workshop on Cryptographic Hardware and Embedded Systems, CHES 2000 (Eds., C.K. Koc and C. Paar), Worcester, Massachusetts, USA, Aug. 17-18, 2000, pp. 93-108, Springer-Verlag, Berlin/Heidelberg, Germany (2000).

Heinrich, J., MIPS R4000 Microprocessor User's Manual, Second Edition, MIPS Technologies, Inc., 1994, pp. 154-155, 157,159, 161, 168, 170-171, B-9, B-10, B-13, B-17, B-19, B-21, B-23, B-27, B-38, B-40, and B-62.

IBM Technical Disclosure Bulletin, "Pipelined Hardware Multiplier with Extended Precision," vol. 23, Issue 9, pp. 4322-4323 (Feb. 1, 1981) (5 pages).

Interrupt Latency in the MC8110, Motorola Semiconductor Engineering Bulletin, Motorola, 1992, pp. 1, 2 and 4-9.

K.H. Leung et al., "FPGA Implementation of a Microcoded Elliptic Curve Cryptographic Processor," IEEE, 2000, pp. 68-76.

Kato, T. et al., "A Design for Modular Exponentiation Coprocessor in Mobile Telecommunication Terminals," in *Proceedings of Second International Workshop on Cryptographic Hardware and Embedded Systems. CHES 2000* (Eds., C.K. Koc, and C. Paar), Worcester, Massachusetts, USA, Aug. 17-18, 2000, pp. 216-228, Springer-Verlag. Berlin/Heidelberg, Germany (2000).

Killian, E., "MIPS Extensions for Digital Media," Microprocessor Forum, Oct. 22-23, 1996, pp. 1-5.

Koc, C. K., and Acar, T., Fast Software Exponentiation in GF(2k), Proceedings of the 13th IEEE Symposium on Computer ,Arithmetic, Jul. 6-9, 1997, pp. 225-231.

Koc, C.K. and Acar, T., "Montgomery Multiplication in GF(2k), "Proceedings of Third Annual Workshop on Selected Areas in Cryptography, pp. 95-106, Queens University, Kingston, Ontario, Canada, Aug. 15-16, 1996 (13 pages).

Kocher, P. et al., "Differential Power Analysis," in *Advances in Cryptology - Proceedings of 19th Annual International Cryptology Conference, CRYPTO '99* (Ed. Michael I. Wiener), Santa Barbara, California, USA, Aug. 15-19, 1999, Springer-Verlag, Berlin/ Heidelberg, Germany (1999) pp. 388-397.

Kutler, Jeffrey, *Smart Cards: Even Abundant Security Features Don't Spur Smart Card Buy-I,*. American Banker, vol. 163, No. 221, Nov. 18, 1998, available in Am. Banker 11998 WL 13326041 (3 pages).

Lee, Ruby, "Accelerating Multimedia with Enhanced Microprocessors," IEEE Micro, IEEE, Apr. 1995, pp. 22-32 (Bates Nos. L08566-L08576).

*Lexra [Products]*, at http://www.lexra.com/lx-products2.html, 2 pages (Copyright 1998-1999).

*Lexra Announces Industry's First RISC-DSP Core Based on MIPS® Instruction Set Architecture*, at http://www.lexra.com/pr_990505. html, 3 pages (May 5, 1999).

*Lexra Announces its LX4080 Evaluation System is Proven and Available for Production*, at http://www. lexra.com/pr_980720.html, 2 pages (Jul. 20, 1998).

*Lexra Announces LX4080 Embedded RISC Processor Core, Delivering High Performance &executes MIPS-I instructions set\**, at http://www.lexra.com/pr980112.html, 2 pages (Jan. 12, 1998).
*Lexra Announces LX4080 SmoothCore™ Silicon Proven RISC Core*, at http://www.lexra.com/pr_980323.html, 3 pages (Mar. 23, 1998).
*Lexra Announces Next Generation Embedded RISC Core*, at http://www.lexra.com/pr_990111.html, 3 pages, (Jan. 11, 1999).
*Lexra Announces the Fastest 32-BIT RISC Core to Execute MIPS® Instructions\**, at http://www.lexra.com/pr_990719.html, 2 pages (Jul. 19, 1999).
*Lexra Announces the First Mainstream 32-bit RISC Core in a Programmable Logic Device*, at http://www.lexra.com/pr_981005.html, 3 pages (Oct. 5, 1998).
*Lexra ASYM-LX Simulator/FIR Filter Demo*, date unknown, 5 pages.
*Lexra ASYM-LX Instruction Set Simulator Product Brief*, date unknown, 2 pages.
*Lexra Command Line User Environment (CLUE) for ASYM-LX User's Guide*, Revision 1.1, Jan. 28, 2000, pp. 1-32.
Lexra Rolls Out Second MIPS Core (Lexra LX4180) (Product Announcement), Microprocessor Report, Jan. 28, 1999, 1 page (printed from West database).
Lijun Gao, Sarvesh Shrivastava, Hanbo Lee, Gerald E. Sobelman, A Compact Fast Variable Size Elliptic Curve Cryptosystem Coprocessor, Proc. of the 7th Annual IEEE Symposium on Field-Programmable Custom Computing Machines, Apr. 21-23, 1999, pp. 304-305.
*LX4080*, at http://vvww.lexra.com/lx4080.html, 8 pages (Copyright 1998-1999).
*LX4080P*, at http://www.lexra.com/lx4080p.html, 6 pages (Copyright 1998-1999).
*LX4280 Fills* Lexra's Midrange (MIPS-compatible embedded processor core) (Product Announcement), *Microprocessor Report*, Aug. 2, 1999, 1 pages (printed from West database).
*LX4280*, at http://www. lexra.com/1x4280.html, 2 pages (Copyright 1998-1999).
*LX5280*, at http://www. lexra.com/lx5280.html, 2 pages (Copyright 1998-1999).
Marketing literature from Philips Semiconductors, "On the Move - Philips Semiconductors and IBM Research to Co-develop Secure Smart Cards" [online]. Feb. 1999, Document order No. 9397.750. 05157, [Retrieved on Feb. 1, 2006]. Retrieved from the Internet: <URL: http:/www.semiconductors.philips.com/acrobat download/literature/9397/75005157.pdf>.
Mayer-Sommer, R., "Smartly Analyzing the Simplicity and the Power of Simple Power Analysis on Smartcards," in Proceedings of Second International Workshop on Cryptographic Hardware and Embedded Systems, CHES 2000 (Eds., C.K. Koc, and C. Paar), Worcester, Massachusetts, USA. Aug. 17-18, 2000, pp. 78-92, Springer-Verlag, Berlin/Heidelberg. Germany (2000).
*MC88110/410DH/AD: MC88410/MC88410 Designer's Handbook*, at http://www.mot-sps.com/lit/html/mc88110410dhad.html, 1 page (Jan. 24, 1997).
*MC88110UM/AD: MC88110 Second Generation RISC Microprocessor User's Manual*, at http://www.mot-sps.com/lit/html/mc88110umad.html, 1 page (Jan. 24, 1997).
*MC88410UM/AD: MC88410 Secondary Cache Controller User's Manual*, at http://www.motsps.com/lit/html/mc88410umad.html, 1 page (Jan. 24, 1997).
*Microprocessor Devices Reliability Monitor Report: Fourth Quarter 1997*, Motorola, 10 pages (1997).
*Microprocessor Devices Reliability Monitor Report: Third Quarter 1997*, Motorola, 8 pages (1997).
*MIPS Technologies, Inc. Files Lawsuit to Protect Intellectual Property Rights*, at http://www.mips.com/pressReleases/102899B.html, 2 pages (Oct. 28, 1999).
*MIPS Technologies, Inc. Litigation Overview and Q&A*, at http://www.mips.com/pressReleases/102899D.html, 3 pages (visited Feb. 24, 2000).
*MIPS: Open Letter from John Bourgoin, CEO, MIPS Technologies*, at http://wvvw.mips.com/pressReleases/102899C.html, 2 pages (visited Feb. 24, 2000).
Naccache, D. and Tunstall. M. "How to Explain Side-Channel Leakage to Your Kids." In *Proceedings of Second International Workshop on Cryptographic Hardware and Embedded Systems, CHES 2000* (Eds., C.K. Koc and C. Paar), Worcester, Massachusetts. USA, Aug. 17-18, 2000, pp. 229-230 Springer-Verlag, Berlin/Heidelberg, Germany (2000).
Patent Abstracts of Japan, Publication No. JP11203106 (Jul. 30, 1999), English Language Abstract for JP Patent Application No. JP19980005096 (Jan. 13, 1998).
Patent Abstracts of Japan, Publication No. JP4142618 (May 15, 1992), English Language Abstract for JP Patent Application No. JP19900264991 (Oct. 4, 1990).
Patent Abstracts of Japan, Publication No. JP61223938 (Oct. 4, 1986), English Language Abstract for JP Patent Application No. JP19850063782 (Mar. 29, 1985).
Patent Abstracts of Japan, Publication No. JP8314717 (Nov. 29, 1996), English Language Abstract for JP Patent Application No. JP19960146619 (May 16, 1996).
Patent Abstracts of Japan, Publication No. JP2003533829T (Nov. 11, 2003), English Language Abstract for JP Patent Application No. JP20010585439T (May 7, 2001).
Peleg, A., and Weiser, U., "MMX Technology Extension to the Intel Architecture," IEEE Micro, IEEE< Aug. 1996, pp. 42-50 (Bates Nos. L07222-L07230).
Philips Semiconductors Short Form Specification, "P16WX064 SmartXA-Family, Secure 16-bit Smart Card Controller," Revision 1.1 [online]. Feb. 2001, pp. 1-11 [Retrieved on Feb. 1, 2006]. Retrieved from the Internet: <URL: httn://www.semiconductors.philips.com/acrobatdownload/other/identification/sfs052411.pdf>.
*QML-DSP/MCM and Die Courier*, at http://www.ti.com/sc/docs/military/liter/ecour/dsp.htp, 7 pages (Jan. 1996).
*Reliability and Quality Report 3Q97*, Motorola, 1997, 2 pages.
*Reliability and Quality Report 4Q97*, Motorola, 1997, 2 pages.
*Reliability Monitor Environmental Stress Data 3Q97*, Motorola, 1997,4 pages.
Running the MC88110 in *Lockstep, Motorola Semiconductor Engineering Bulletin, Motorola, 1992,* 2 pages.
*Security Target BSI-DSZ-CC-0203, Version 1.1, Jan. 24th, 2003, Evaluation of the Philips P16WX064VOC Secure 16-bit Smart Card Controller* [online]. Philips Semiconductors GmbH, pp. 1-74 [Retrieved on Feb. 1, 2006]. Retrieved from the Internet: <URL: http://www.commoncriteriaportal.org/public/files/epfiles/0203.pdf>.
Shamir. A., "Protecting Smart Cards from Passive Power Analysis with Detached Power Supplies," in *Proceedings of Second International Workshop on Cryptographic Hardware and Embedded Systems. CHES 2000* (Eds., C.K. Koc and C. Paar), Worcester, Massachusetts, USA, Aug. 17-18, 2000, pp. 71-77 Springer-Verlag, Berlin/Heidelberg, Germany (2000).
Shi, Z., et al., "Bit Permutation Instructions for Accelerating Software Cryptography," Proceedings of the IEEE International Conference on Application-specific Systems, Architectures and Processors, pp. 138-148, Boston, MA (Jul. 10-12, 2000).
*STMicroelectronics And Gemplus Announce Smart Card Security Certification Including Hardware and Software*, EDP Weekly's IT Monitor, vol. 42, Issue 13, Apr. 2, 2001, available in EDP Wkly. .42001 WL 14018034 (3 pages).
*STMicroelectronics and Gemplus Announce Smart Card Security Certification Including Hardware and Software*. Business Wire, Mar. 29, 2001, available in Westlaw, Mar. 29, 2001 Bus. Wire 02:05:00 (3 pages).
Tanenbaum, A.S., Structured Computer Organization, Prentice-Hall, Inc. 1984, pp. 10-12.
*TMS320C80 Digital Signal Processor*, Texas Instruments, Jul. 1984, 5 Pages.
Turley, J., "Siemens TriCore Revives CISC Techniques," *Microprocessor Report*. MicroDesign Resources, Nov. 17,1997, pp. 13- 16.
Vollmer, A., *Security ICs Are Targeting Consumer Applications*, Electronic Design, vol. 48, Issue 23, Nov. 6, 2000, available in Electronic Design I052000 WL 14003957 (13 pages).
Weingart, S.H., "Physical Security Devices for Computer Subsystems: A Survey of Attacks and Defenses," in *Proceedings of Second International Workshop on Cryptographic Hardware and Embedded Systems, CHES 2000* (Eds., C.K. Koc and C. Paar), Worcester, Massachusetts, USA, Aug. 17-18, 2000, pp. 302-317, Springer-Verlag, Berlin/Heidelberg, Germany (2000).

Weiss, R., *ARM Piccolo Mixes ARM RISC with DSP*, at http://ww.estd.com/Editorial/1996/11/Briefs/arm.html, 1 page (Nov. 1996).

*88910 Second Level Cache*, Microprocessor Forum, Motorola Inc., Nov. 1991, 20 pages (Bates Nos. L00622-L00641).

El-Sharkawy, Moharmed, Ph.D., *Digital Signal Processing Applications with Motorola's DSP56002 Processor*, Prentice Hall PTR, 1996, pp. 43-124 (Bates Nos. L06519-L06601).

Hays, Pat, *LX5280 High-Performance RISC-DSP for IP Licensing*, at http://www.lexra.com/presentation/, 27 pages (Jun. 8, 1999).

Intersil Data Sheet. "HS-RTX2010RH: Radiation Hardened Real Time Express Microcontroller," [online] Mar. 2000, [Retrieved on Feb. 16, 2006] Retrieved from the Internet: <URL: httpl://www.intersil.com/data/fn/fn3961.pdf> (36 pages).

Kato, T. et al., "A Design for Modular Exponentiation Coprocessor in Mobile Telecommunication Terminals," in *Proceedings of Second International Workshop on Cryptographic Hardware and Embedded Systems. CHES 2000* (Eds., C.K. Koc, and C. Paar), Worcester, Massachusetts, USA, Aug. 17-18, 2000, pp. 216-228, Springer-Verlag. Berlin/Heidelberg, Germany (2000).

*LX4180*, at http://www.lexra.com/lx4180.html, Lexra Inc., 9 pages (Copyright 1998-1999).

Peleg, A., and Weiser, U., "MMX Technology Extension to the Intel Architecture," IEEE Micro, IEEE<Aug. 1996, pp. 42-50 (Bates Nos. L07222-L07230).

*Piccolo—The ARM Signal Processing Architecture*, at http://calab.cs.pusan.kr/TechnicalReport . . . , 12 pages (visited Mar. 6, 2001).

Texas Instruments Application Report, "The MSP430 Harware Multiplier, Functions and Applications," [online] Apr. 1999, [Retrieved on Feb. 16, 2006] Retrieved from the Internet: <URL: http://focus.ti.com/lit/an/slaa042.pdf> (34 pages).

Turley, J., "TI's New C6x DSP Screams at 1,600 MIPS," Microprocessor Report, Feb. 17,1997, pp. 14-17.

Wikibooks article, "Data Coding Theory/Modulo-2 Arithmetic", author unknown, retrieved Jul. 30, 2008, 2 Pages.

Wikipedia article, "Finite field arithmetic", www.wikipedia.com, author unknown, retreived Jul. 30, 2008, 4 Pages.

Yarlagadda, Krishna, "Lexra Adds DSP Extensions," Microprocessor Design Resources, Inc., vol. 13, Issue 11, Aug. 23, 1999, pp. 19-21 (printed from West database, 6 pages).

Office Communication, dated Dec. 29, 2003, for U.S. Appl. No. 09/788,682, filed Feb. 21, 2001, 8 pages.

Office Communication, dated Jun. 24, 2004, for U.S. Appl. No. 09/788,682, filed Feb. 21, 2001, 5 pages.

Office Communication, dated Nov. 19, 2004, for U.S. Appl. No. 09/788,682, filed Feb. 21, 2001, 6 pages.

Office Communication, dated Jun. 27, 2005, for U.S. Appl. No. 09/788,682, filed Feb. 21, 2001, 5 pages.

Office Communication, dated Feb. 22, 2006, for U.S. Appl. No. 09/788,682, filed Feb. 21, 2001, 6 pages.

Heinrich, J., MIPS R4000 Microprocessor User's Manual, Second Edition, MIPS Technologies, Inc., 1994, pp. 154-155, 157, 159, 161, 168, 170-171, B-9, B-10, B-13, B-17, B-19, B-21, B-23, B-27, B-38, B-40, and B-62.

Patent Abstracts of Japan, Publication No. JP11203106 (Jul. 30, 1999), English Language Abstract for JP Patent Application No. JP19980005096 (Jan. 13, 1998).

IBM Technical Disclosure Bulletin, "Bit-Manipulation Facility for a Parallel Architecture," vol. 34, No. 7A, Dec. 1991, pp. 387-390.

Digital Equipment Corporation, VAX 11/780 Architecture Handbook, 1977, pp. 6-39 to 6-41.

"Galois Field Polynomial Generator Function Register," TMS320C6000 CPU and Instruction Set Reference Guide, Texas Instruments, Oct. 2000, p. 2-26.

\* cited by examiner

VIRTUAL INSTRUCTION EXPANSION USING PARAMETER SELECTOR DEFINING LOGIC OPERATION ON PARAMETERS FOR TEMPLATE OPCODE SUBSTITUTION

CROSS-REFERENCE TO RELATED APPLICATIONS

This application is a continuation of U.S. patent application Ser. No. 09/788,682, filed Feb. 21, 2001 (now U.S. Pat. No. 7,162,621 B2) which is incorporated herein by reference in its entirety.

This application is related to the following commonly owned applications, each of which is incorporated herein by reference in its entirety: U.S. application Ser. No. 09/788,683, filed Feb. 21, 2001 (now U.S. Pat. No. 7,237,097 B2); U.S. application Ser. No. 09/788,670, filed Feb. 21, 2001; U.S. application Ser. No. 09/788,684, filed Feb. 21, 2001; and U.S. application Ser. No. 09/788,685, filed Feb. 21, 2001 (now U.S. Pat. No. 7,181,484 B2).

FIELD OF THE INVENTION

This invention relates to a technique for providing configurable instruction sequence generation, and more particularly to a technique for using virtual instructions to generate a sequence of instructions to be executed by a processor.

BACKGROUND OF THE INVENTION

Reduced instruction set computer (RISC) architectures were developed as industry trends tended towards larger, more complex instruction sets. By simplifying instruction set designs, RISC architectures make it easier to use techniques such as pipelining and caching, thus increasing system performance. By focusing on speed and simplicity of design, rather than instruction semantics, RISC architectures often result in larger executable code size than comparable complex instruction set computer (CISC) architecture machines. For example, a task that may be represented as one complex instruction in a CISC architecture may take two or more instructions in a RISC architecture. However, the performance gains resulting from increased clock speeds and increased pipelining that may be attained with a RISC architecture usually outweigh any increase in executable code size.

RISC architectures usually have fixed-length instructions (e.g., 16-bit, 32-bit, or 64-bit), with few variations in instruction format. For example, each instruction in an instruction set architecture (ISA) may have the source registers in the same location. For example, a 32-bit ISA may have source registers specified always by bits 16-20 and 21-25. This allows the specified registers to be fetched for every instruction without requiring any complex instruction decoding.

SUMMARY

In one general aspect, an instruction set architecture includes a virtual instruction for generating a sequence of underlying machine instructions. A virtual instruction includes an opcode that identifies the instruction as a virtual instruction. The virtual instruction, having zero or more virtual parameters, is associated with a sequence of instructions.

Implementations may include a virtual instruction index within a virtual instruction code. The index may identify one virtual instruction from multiple available virtual instructions. Some implementations may provide virtual parameters, each of which includes a predetermined number of bits; or each of which includes either a first predetermined number of bits or a second predetermined number of bits. For example, one implementation may provide three-bit and five-bit virtual parameters.

Each virtual instruction is associated with a sequence of instructions to execute. Each instruction in the sequence may include an instruction template identifying an instruction to be performed, a parameter selector identifying a dynamic parameter substitution, and other control information relating to the execution of that instruction within the sequence. Implementations may include one or more of the following substitutions: a parameter field, such as a register specifier, may be replaced by a virtual parameter; an opcode field may be replaced by a virtual parameter; an immediate field may be replaced by a virtual parameter; an immediate field may be replaced with a sign-extension of a virtual parameter; and an immediate field may be replaced with sign-extended or unextended concatenations of one or more virtual parameters.

The details of one or more implementations are set forth in the accompanying drawings and the description below. Other features and advantages will be apparent from the description and drawings, and from the claims.

DETAILED DESCRIPTION

A virtual instruction is an instruction that is not executed directly by a processor. Rather, a virtual instruction causes a sequence of one or more instructions to be generated. The generated instructions then are executed by the processor. Virtual instructions may be used to provide more complex instructions in an ISA.

For example, a standard ISA may not have an operation for adding three numbers together and storing the result in a register. A particular application using the ISA may repeatedly add three numbers. The developers of a processor for the particular application may not wish to modify the processor entirely, yet significant code compaction may be obtained by providing an instruction for adding three numbers. A virtual instruction called "ADD3" that adds three numbers may be provided. Whenever the "ADD3" instruction is fetched, the system identifies the instruction as a virtual instruction and generates a corresponding sequence of instructions to add three numbers.

Virtual instructions provide a mechanism to implement a configurable instruction set architecture so that application-specific instructions or other specialized instructions may be added to an instruction set without redesigning or modifying a processor core.

Figure 1:
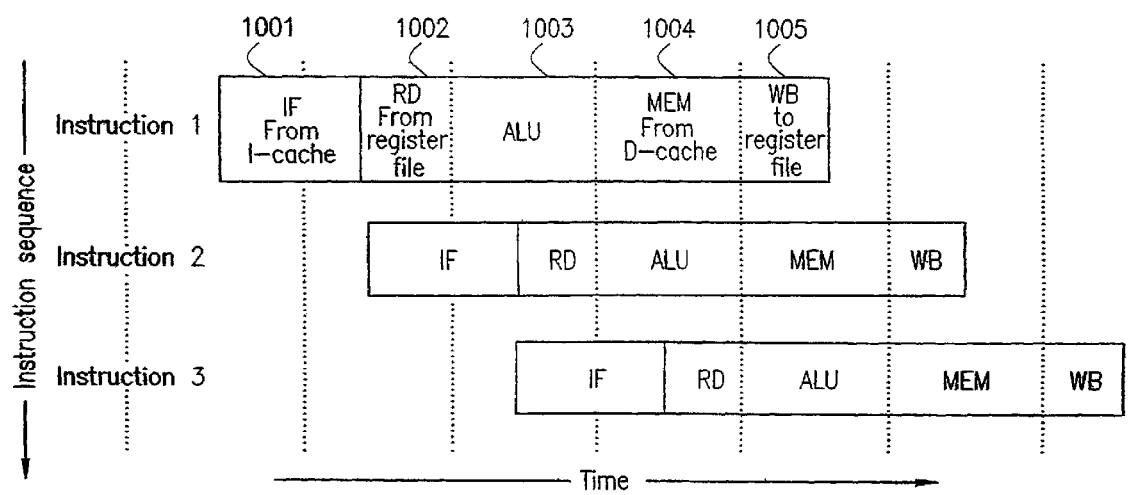
FIG. 1 is a block diagram of an exemplary five-stage pipeline that may be used in a RISC architecture.

Referring to FIG. 1, an exemplary microprocessor architecture that may be used to implement virtual instructions includes a five-stage pipeline in which each instruction is executed in a fixed amount of time, such as, for example, four clock cycles. The execution of each instruction is divided into five stages: instruction fetch (IF) stage 1001, register read (RD) stage 1002, arithmetic/logic unit (ALU) stage 1003, memory (MEM) stage 1004, and write back (WB) stage 1005. In the IF stage 1001, a specified instruction is fetched from an instruction cache. A portion of the fetched instruction is used to specify source registers that may be used in executing the instruction. In the read registers (RD) stage 1002, the system fetches the contents of the specified source registers. These fetched values may be used to perform arithmetic or logical operations in the ALU stage 1003. In the MEM stage 1004, an executing instruction may read/write memory in a data cache. Finally, in the WB stage 1005, values obtained by the execution of the instruction may be written back to a register.

Because some operations, such as floating point calculations and integer multiply/divide, cannot be performed in a single clock cycle, some instructions merely begin execution of an operation. After sufficient clock cycles have passed, another instruction may be used to retrieve a result. For example, an integer multiply instruction may take, for example, five clock cycles. One instruction may initiate the multiplication calculation, and another instruction may load the results of the multiplication into a register.

Virtual instructions help to offset costs that may be associated with the simplicity, elegance, and adherence to design principles provided by RISC architectures. Because multiple RISC instructions often are used instead of a single complex instruction, the overall size of executables is larger for RISC architectures than for others. Because computer storage is usually inexpensive, the increased storage costs are rarely a factor. However, in some applications, such as smart cards and application specific integrated circuits (ASICs), the available memory may be limited. In applications such as these, virtual instructions provide a mechanism for reducing the size of executables without significantly reducing pipeline efficiency.

Virtual instructions also offer benefits in consumer electronics, such as wireless telephones, global positioning system receivers, electronic games, and personal digital assistants, which have contributed to the growth of the embedded CPU market. Instead of building devices from commercially available, general-purpose components, manufacturers have increasingly turned to designs based on application-specific integrated circuits (ASICs). When CPU cores are embedded on chips complete with on-board caches and memory, the amount of storage space may be limited. Virtual instructions help to decrease the size of executables by adding the capability of executing complex instructions.

For example, a developer may need a compact code solution for embedded control applications. Some CISC products may include 32-bit instructions capable of setting, clearing, or testing a single bit in memory or input/output (I/O) space. While it generally may not be desirable to include such operations within a RISC processor core, virtual instructions provide a general mechanism in a RISC ISA that allows developers to add complex instructions appropriate to specific applications.

Figure 2:
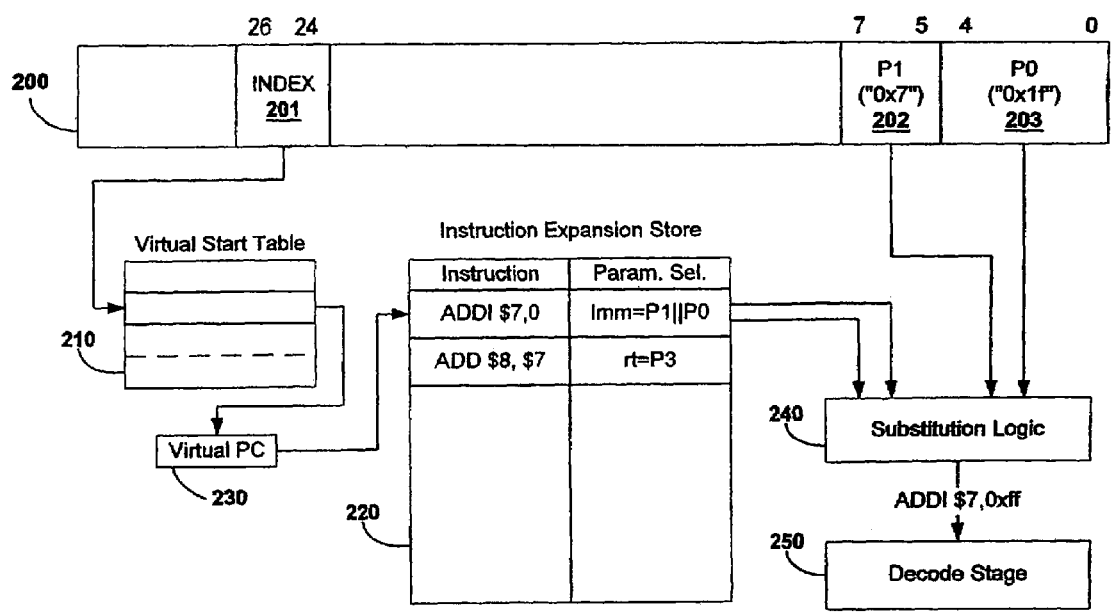
FIG. 2 is a block diagram showing parameter substitution for an exemplary configurable sequence generation instruction.

Referring to FIG. 2, a virtual instruction 200 is used to generate a sequence of instructions. In one implementation, virtual instruction 200 includes an index 201 and zero or more parameters, such as parameters 202 and 203. In this implementation, index 201 references a location within a virtual start table 210 to identify a start address for the appropriate sequence of instructions within an instruction expansion store 220.

In FIG. 2, index 201 is three bits long. Thus, eight virtual instructions may be specified in this implementation. As will be discussed more fully below, there is a tradeoff between the number of virtual instructions available and the amount of parameter information that may be encoded in a virtual instruction. Index 201 identifies an address within the virtual start table 210. Virtual start table 210 may be a data structure containing information about the locations of instructions corresponding to index 201. For example, virtual start table 210 may contain a start address within instruction expansion store 220 for each virtual instruction.

Instruction expansion store 220 may be implemented as a data structure containing one or more rows of data. Each row within the data structure may include an instruction to be executed as well as a dynamic parameter selector and other control information. For example, the exemplary instruction expansion store 220 shown in FIG. 2 includes the instruction "ADDI $7, 0" and the dynamic parameter selector "Imm=P1||P0". The ADDI instruction adds the contents of a register and an immediate value and stores the result in an indicated register. In this example, the parameters P1 and P0 are concatenated and substituted for the immediate value within the instruction, resulting in "ADDI $7,0xff". Thus, the value "0xff" will be added to register $7. The next instruction in the sequence is "ADD $8, $7" with the parameter selector "rt=P3". The ADD instruction adds the contents of two registers and stores the result in an indicated register. In this example, substitution yields the instruction "ADD $8, $7, $9" assuming the contents of P3 is "9". Thus, the contents of registers $7 and $9 are added and stored in register $8.

A virtual program counter (PC) 230 stores the address or offset of the current instruction within the instruction expansion store 220. For example, when a virtual instruction begins execution, the start address for the corresponding instruction sequence is loaded into the virtual PC 230. As each instruction is executed, virtual PC 230 may be updated to step through the instruction expansion store 220 until the last instruction within a sequence is generated.

The last instruction within a virtual instruction expansion may be indicated in many ways. For example, information stored along with the dynamic parameter selector may be used to indicate the end of an instruction sequence. For example, if a 32-bit word is used to direct dynamic parameter substitution, one or more bits may be used to indicate that the instruction is the last within an expansion. Additionally, a new instruction may be used to indicate that the last instruction has been reached.

Substitution logic 240 is used to substitute parameters from virtual instruction 200 into instruction templates from instruction expansion store 220. The resulting instruction then may be passed on to the decode stage 250 of the processor.

Additional implementations may not use a virtual start table 210. If only a single virtual instruction is provided, or if virtual instruction expansion information is stored in a fixed or known location, then the extra level of indexing provided by virtual start table 210 may be unnecessary. In such implementations, index 201 also may not be needed, and an opcode may be sufficient to identify a particular virtual instruction and to locate the beginning of corresponding instructions within instruction expansion store 220.

Figure 3:
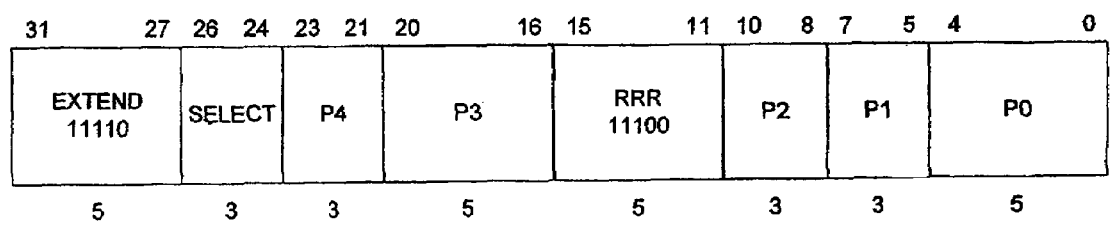
FIG. 3 is an instruction encoding for an exemplary configurable sequence generation instruction.

Referring to FIG. 3, a virtual instruction 200 may be encoded in a 32-bit instruction architecture. In this exemplary encoding, bits 11-15 and 27-31 identify the instruction as a virtual instruction. Select bits 24-26 may be used to identify one of eight virtual instructions that can be implemented. The remaining bits specify parameters used by substitution logic 240. These may be used to identify immediate values, opcodes and/or sub-opcodes, and to identify registers to be used by instructions within a virtual instruction sequence.

During execution of a virtual instruction, the virtual instruction is held in the instruction fetch stage of the pipeline, and the PC, as opposed to the virtual PC, remains fixed at the address of the virtual instruction, while the fetch logic passes a fixed sequence of instructions to the decode stage of the pipe. When the last instruction has been issued, the PC can advance. As the entire sequence takes place at the same PC, conventional branches which manipulate the PC may not take place internal to the virtual instruction sequence—though a virtual instruction sequence could conceivably terminate with a control transfer. Conditional execution within a virtual instruction may be handled in terms of conditional moves or other predicated execution mechanisms. In the simplest implementation, any exceptions taken during the execution of the virtual instruction sequence use the address of the virtual instruction as the value of the exception return address (EPC) register or error PC, and restart the virtual instruction sequence from the beginning after completion of any exception handling. For this reason, it may be desirable to use virtual instructions that are fully restartable at any point in their execution.

Additional implementations may allow branching within a virtual instruction expansion. For example, one virtual instruction implementation may provide specific instructions for branching within a virtual instruction sequence, allowing branching within the expansion of a virtual instruction. Another implementation may redefine the semantics of branch instructions so that when conventional branch instructions are encoded within a virtual instruction expansion they exhibit different behavior. Other virtual instruction branching schemes will be apparent.

In the following discussion, "VINSTR" is used as the name for application-specific virtual instructions. Generic compiler tools may assemble and disassemble the instruction by that name, but tools also may give application-specific names to various VINSTR instantiations. For example, the generic VINSTR instruction includes the parameters as shown in FIG. 3: SELECT, P0, P1, P2, P3, and P4. The SELECT parameter determines which of the possible virtual instruction sequences to execute. The remaining parameters are used as defined by instruction sequences stored in instruction expansion store 220. The exemplary encoding shown has five parameter fields, with two having five bits and three having three bits. Additional implementations may use any number of parameters and any number of bits to encode each parameter. For example, one implementation may use three parameter fields, with each parameter having five bits.

Additional implementations may encode a virtual instruction using a code to specify the virtual instruction expansion to be performed, and one or more parameters. As will be discussed below with reference to parameter selection, there is a trade-off between compactness, complexity, and flexibility of parameter substitutions.

Figure 4:
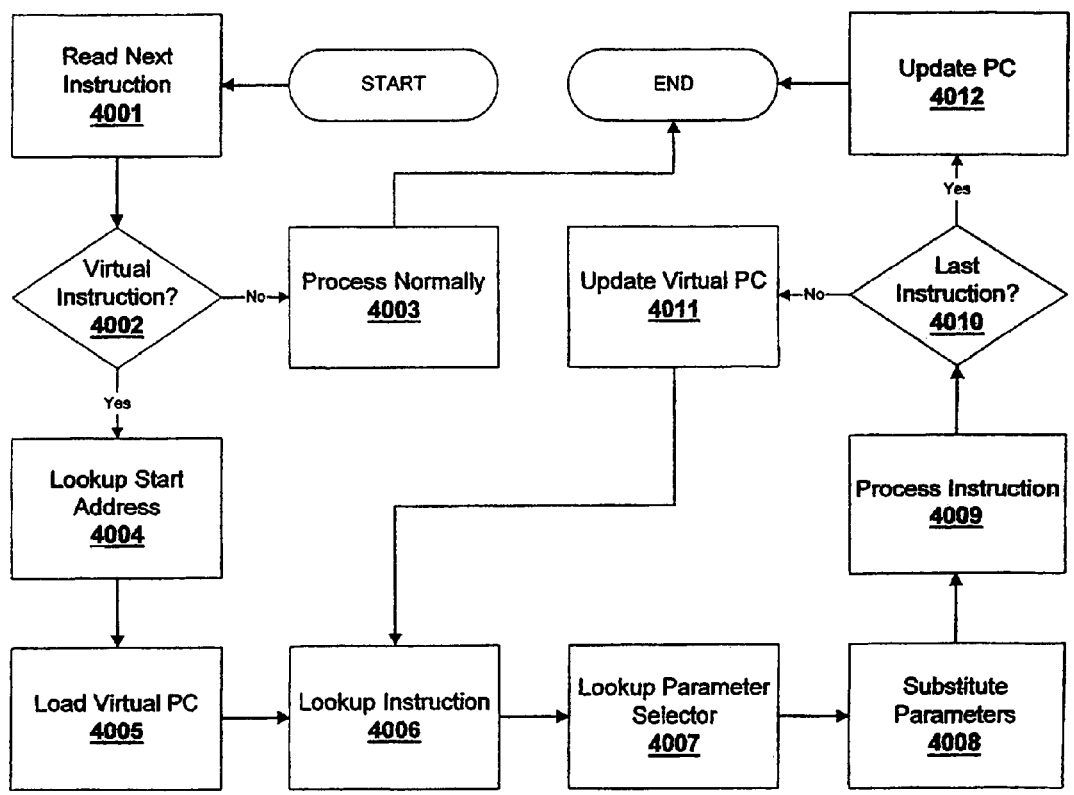
FIG. 4 is a flowchart showing a method of processing virtual instructions.

Referring to FIG. 4, virtual instructions may be processed using the structures described above with reference to FIG. 2. Initially, a processor reads the next instruction (step 4001). The processor then determines if the instruction is a virtual instruction (step 4002). If it is not, then the processor processes the instruction normally (step 4003). If the instruction is a virtual instruction, then the system determines the start address of the virtual instruction (step 4004). If more than one virtual instruction is supported, an index 201 may be used to specify a particular virtual instruction to execute. This index may be used to look up start values within virtual start table 210. This table may hold an address within instruction expansion store 220 of the first instruction to be executed. The system then loads the start address into the virtual PC (step 4005).

Next, the system uses the start address referenced by virtual PC 230 to lookup an instruction within instruction expansion store 220 (step 4006). For example, the virtual PC 230 shown in FIG. 2 references the instruction "ADDI $7, 0" within instruction store 220. The system also obtains a corresponding parameter selector (step 4007). This selector, which is discussed below, specifies which parameters from virtual instruction 200 to substitute into the current instruction. The system uses the instruction and parameter selector to perform parameter substitution (step 4008).

In some implementations, the parameter selector may support predicated execution of instructions within a virtual instruction expansion. Predicated execution may be implemented by using a parameter selector to indicate whether an instruction should be suppressed based on, for example, one or more virtual instruction parameters. In such an implementation, an instruction template, such as the "ADDI $7, 0" shown in FIG. 2, may include a corresponding parameter selector that indicates whether to suppress an instruction based on a parameter value. For example, the parameter selector may indicate to suppress the corresponding instruction based on the value of a parameter, such as P3. Instructions may be suppressed by issuing a NOP or other similar function.

The resulting instruction is returned as the result of IF stage 1001. The processor then executes this instruction (step 4009). Finally, the system determines if this was the last instruction within a virtual instruction sequence (step 4010). If there are additional instructions, the virtual PC is updated (step 4011) and the next instruction is loaded (step 4006). If there are no additional instructions, then the PC is updated (step 4012). In this implementation, the PC is not updated until the entire virtual instruction sequence is complete.

To support dynamic parameter substitution, the virtual instruction expansion store may contain more than just the sequence of 32-bit instructions to be presented to the pipeline. Additional information may be provided to indicate when, and how, parameters should be substituted for the literal content of fields within each 32-bit instruction.

Implementations may support any combination of the following dynamic parameter substitutions: (1) replacement of a parameter field with a translated or untranslated VINSTR parameter field; (2) replacement of an immediate field with a sign-extension of a VINSTR parameter field; (3) replacement of a portion of an immediate field with a VINSTR parameter field; (4) replacement of an immediate field with sign-extended or unextended concatenations of parameter fields; and/or (5) replacement of an instruction opcode or subopcode with a translated or untranslated VINSTR parameter.

One dynamic parameter substitution that may be provided is to replace a selected register field with a virtual instruction parameter. For example, an "ADD" instruction may have three parameters: "RS", "RT", and "RD". The instruction causes the contents of the register specified by RS to be added to the contents of the register specified by RT and then stored in the register specified by RD. In virtual instruction 200, two parameters are specified, one parameter 202 having 3 bits and one parameter 203 having 5 bits. One implementation provides 32 registers, each register specified by 5 bits. In this example, parameter 202 may be translated to a 5-bit register specification. For example, one translation may be to append "00" to the beginning of the three-bit value, allowing only registers 0 to 8 to be specified.

Additional translations may be used. However, it may be necessary to limit certain expansions to certain parameter fields in order to reduce the combinatorial explosion of specifier data. There is a trade off between the increase in virtual instruction size and the decrease in virtual instruction capability that results from more restricted substitution.

Another dynamic parameter substitution that may be performed is the replacement of an immediate field with a sign-extension of a VINSTR parameter field. For example, the "ADDI" instruction allows an immediate value to be added to the contents of a register. This substitution allows the immediate value field to be specified by one of the virtual instruction parameter fields. The immediate field may be 16 bits, while the virtual instruction parameter may be only five bits. However, the 5-bit value may be sign extended to 16 bits. Sign extension may not be needed if the instructions are stored initially with zeros in the immediate field.

Another dynamic parameter substitution includes the replacement of immediate fields with sign-extended or unextended concatenations of parameter fields. For example, 8-bit immediate values may be created by concatenating 3-bit and 5-bit virtual instruction parameter fields. Additionally, dynamic parameter substitution may include the replacement of an instruction opcode or sub-opcode with a translated or untranslated VINSTR parameter field. This allows, for example, one or more instructions in a virtual instruction sequence to be selected by one or more VINSTR parameters.

In addition to virtual instruction implementations using hardware, (e.g., within a microprocessor or microcontroller) implementations also may be embodied in software disposed, for example, in a computer usable (e.g., readable) medium configured to store the software (i.e., a computer readable program code). The program code causes the enablement of the functions or fabrication, or both, of the systems and techniques disclosed herein. For example, this can be accomplished through the use of general programming languages (e.g., C, C++), hardware description languages (HDL) including Verilog HDL, VHDL, AHDL (Altera HDL) and so on, or other available programming and/or circuit (i.e., schematic) capture tools. The program code can be disposed in any known computer usable medium including semiconductor, magnetic disk, optical disk (e.g., CD-ROM, DVD-ROM) and as a computer data signal embodied in a computer usable (e.g., readable) transmission medium (e.g., carrier wave or any other medium including digital, optical, or analog-based medium). As such, the code can be transmitted over communication networks including the Internet and intranets.

It is understood that the functions accomplished and/or structure provided by the systems and techniques described above can be represented in a core (e.g., a microprocessor core) that is embodied in program code and may be transformed to hardware as part of the production of integrated circuits. Also, the systems and techniques may be embodied as a combination of hardware and software. Accordingly, other implementations are within the scope of the following claims.

What is claimed is:

1. A microprocessor providing an extendable instruction set architecture, the microprocessor comprising:
    a memory for storing at least one virtual instruction that includes an index and at least one parameter;
    a virtual instruction expansion store referenced by the index including at least one instruction template and at least one parameter selector that defines a logical operation to perform on the at least one parameter; and
    substitution logic that forms a sequence of at least one expanded instruction each expanded instruction of the sequence based on a respective instruction template of the virtual instruction expansion store and comprising an opcode and a new parameter for use with the respective instruction template, the new parameter generated by performing the logical operation corresponding to the respective instruction template only on one or more parameters of the at least one parameter.

2. The microprocessor of claim 1, wherein bits of the opcode are formed by substituting a translation of bits of the at least one parameter into the at least one instruction template.

3. The microprocessor of claim 1, wherein bits of the opcode are formed by zero-extending at least one bit of the at least one parameter.

4. The microprocessor of claim 1, further comprising:
    a virtual start table coupled to the virtual instruction expansion store.

5. The microprocessor of claim 4, further comprising:
    a virtual program counter coupled between the virtual start table and the virtual instruction expansion store.

6. The microprocessor of claim 1, wherein the virtual instruction includes a first parameter having a first number of bits and a second parameter having a second number of bits.

7. The microprocessor of claim 6, wherein the first parameter includes at least three bits.

8. The microprocessor of claim 7, wherein the second parameter includes at least five bits.

9. A method for generating a sequence of at least one expanded instruction from a virtual instruction, comprising:
    receiving a virtual instruction that includes an index and at least one parameter;
    identifying an instruction template and a parameter selector based on the index, the parameter selector defining a logical operation to perform on one or more of the at least one parameter; and
    forming a sequence of at least one expanded instruction each expanded instruction of the sequence based on a respective instruction template and comprising an opcode and a new parameter for use with the respective instruction template, the new parameter generated by performing the logical operation corresponding to the respective instruction template only on one or more parameters of the at least one parameter.

10. The method of claim 9, wherein the forming step comprises:
    substituting at least one bit of the at least one parameter into respective the instruction template.

11. The method of claim 9, wherein the forming step comprises:
    substituting a translation of bits of the at least one parameter into the respective instruction template.

12. The method of claim 9, wherein the forming step comprises:
    zero-extending at least one bit of the at least one parameter.

13. The method of claim 9, wherein the receiving step comprises receiving a virtual instruction including a first parameter having a first number of bits and a second parameter having a second number of bits.

14. The method of claim 13, wherein the receiving step comprises receiving a virtual instruction including a first parameter having at least three bits and a second parameter having at least five bits.

15. A computer-readable medium comprising a microprocessor embodied in software, the microprocessor including:
    a memory for storing at least one virtual instruction that includes an index and at least one parameter;

a virtual instruction expansion store referenced by the index including at least one instruction template and at least one parameter selector that defines a logical operation to perform on the at least one parameter; and substitution logic that forms a sequence of at least one expanded instruction each expanded instruction of the sequence based on a respective instruction template of the at least one instruction template and comprising an opcode and a new parameter for use with the respective instruction template, the new parameter generated by performing the logical operation corresponding to the respective instruction template only on one or more parameters of the at least one parameter.

16. The computer readable medium of claim 15, wherein bits of the opcode are formed by substituting a translation of bits of the at least one parameter into the at least one instruction template.

17. The computer readable medium of claim 15, wherein bits of the opcode are formed by zero-extending at least one bit of the at least one parameter.

18. The computer readable medium of claim 15, wherein the microprocessor includes:

a virtual start table coupled to the virtual instruction expansion store.

19. The computer readable medium of claim 18, wherein the microprocessor includes:

a virtual program counter coupled between the virtual start table and the virtual instruction expansion store.

20. The computer readable medium of claim 15, wherein the virtual instruction includes a first parameter having a first number of bits and a second parameter having a second number of bits.

21. The computer readable medium of claim 15, wherein the microprocessor is embodied in hardware description language software.

22. The computer readable medium of claim 15, wherein the microprocessor is embodied in one of Verilog hardware description language software and VHDL hardware description language software.

* * * * *